US010791137B2

(12) United States Patent
Chawla et al.

(10) Patent No.: US 10,791,137 B2
(45) Date of Patent: Sep. 29, 2020

(54) RISK ASSESSMENT AND REMEDIATION

(71) Applicant: SYNACK, INC., Redwood City, CA (US)

(72) Inventors: Kirti Chawla, Redwood City, CA (US); Mark Kuhr, Redwood City, CA (US)

(73) Assignee: SYNACK, INC., Redwood City, CA (US)

( * ) Notice: Subject to any disclaimer, the term of this patent is extended or adjusted under 35 U.S.C. 154(b) by 319 days.

(21) Appl. No.: 15/921,577

(22) Filed: Mar. 14, 2018

(65) Prior Publication Data
US 2019/0289029 A1    Sep. 19, 2019

(51) Int. Cl.
*H04L 29/06* (2006.01)

(52) U.S. Cl.
CPC ...... *H04L 63/1433* (2013.01); *H04L 63/1425* (2013.01)

(58) Field of Classification Search
CPC ..................... H04L 63/1433; H04L 63/1425
See application file for complete search history.

(56) References Cited

U.S. PATENT DOCUMENTS

| 8,984,643 | B1 * | 3/2015 | Krisher | ............... | H04L 63/1433 726/25 |
| 9,324,119 | B2 | 4/2016 | Singh et al. | | |
| 9,413,780 | B1 * | 8/2016 | Kaplan | ............... | H04L 63/1466 |
| 9,438,626 | B1 | 9/2016 | Zilberberg et al. | | |
| 9,501,647 | B2 | 11/2016 | Yampolskiy et al. | | |
| 10,467,419 | B1 * | 11/2019 | Youngberg | ........... | G06F 21/577 |
| 10,606,825 | B1 * | 3/2020 | Sosonkin | ............ | G06F 21/6227 |
| 2005/0229255 | A1 * | 10/2005 | Gula | ................... | H04L 63/1408 726/23 |
| 2009/0126012 | A1 | 5/2009 | Treadwell et al. | | |

(Continued)

FOREIGN PATENT DOCUMENTS

WO    WO2016123528 A1    8/2016

*Primary Examiner* — Sarah Su
(74) *Attorney, Agent, or Firm* — Hickman Palermo Becker Bingham LLP

(57) ABSTRACT

A method of assessing and addressing computer security risk is disclosed. The method comprises receiving, by a processor, a request for an engagement to identify vulnerabilities of a networked computer system; computing, by the processor, a pre-engagement risk score for the networked computer system corresponding to a plurality of vulnerability areas; causing, by the processor, performance of a penetration test as part of the engagement by a plurality of researcher computers to identify vulnerabilities of the networked computer system in at least one of the plurality of vulnerability areas; determining a researcher computer cost describing a cost incurred by the plurality of researcher computers during the engagement; determining a vulnerability factor associated with a group of vulnerabilities identified by the plurality of researcher computers during the engagement; calculating a post-engagement risk score for the networked computer system based on the researcher computer cost and the vulnerability factor; and transmitting the post-engagement risk score to the client device to improve security of networked computer system.

20 Claims, 7 Drawing Sheets

(56) References Cited

U.S. PATENT DOCUMENTS

| | | | |
|---|---|---|---|
| 2009/0205047 A1* | 8/2009 | Podjarny | G06F 21/577 |
| | | | 726/25 |
| 2013/0205397 A1* | 8/2013 | De Barros | H04L 63/1433 |
| | | | 726/25 |
| 2014/0013434 A1* | 1/2014 | Ranum | H04L 63/145 |
| | | | 726/24 |
| 2014/0325670 A1 | 10/2014 | Singh et al. | |
| 2015/0074579 A1 | 3/2015 | Gladstone et al. | |
| 2015/0154599 A1 | 6/2015 | Lyda et al. | |
| 2016/0112445 A1* | 4/2016 | Abramowitz | H04L 63/1433 |
| | | | 726/23 |
| 2016/0182556 A1 | 6/2016 | Tatourian et al. | |
| 2016/0342796 A1* | 11/2016 | Kaplan | H04L 63/1433 |
| 2017/0013014 A1* | 1/2017 | Foster | H04L 67/146 |
| 2017/0091460 A1* | 3/2017 | Kuhr | G06F 21/577 |
| 2017/0123925 A1* | 5/2017 | Patnaik | G06F 11/143 |
| 2017/0213037 A1 | 7/2017 | Toledano et al. | |
| 2017/0300698 A1* | 10/2017 | Chawla | G06F 16/951 |
| 2017/0346837 A1* | 11/2017 | Vaswani | H04L 63/1416 |
| 2018/0278642 A1* | 9/2018 | Joy | H04L 63/1433 |
| 2019/0052664 A1* | 2/2019 | Kibler | H04L 63/1433 |
| 2019/0064919 A1* | 2/2019 | Bastide | G06T 19/003 |
| 2019/0362354 A1* | 11/2019 | Zaslaysky | G06Q 20/4016 |
| 2020/0106803 A1* | 4/2020 | Schwartz | H04L 63/0263 |

\* cited by examiner

| CVSS Score Interval | Multiplier |
|---|---|
| [0.00, 0.99] | 2 |
| [1.00, 1.99] | 5 |
| [2.00, 2.99] | 10 |
| [3.00, 3.99] | 20 |
| [4.00, 4.99] | 50 |
| [5.00, 5.99] | 100 |
| [6.00, 6.99] | 200 |
| [7.00, 7.99] | 500 |
| [8.00, 8.99] | 1000 |
| [9.00, 10.00] | 10000 |

| CVSS Score Interval | Vulnerability Severity Label |
|---|---|
| [0.00, 3.99] | Low Severity Vulnerability |
| [4.00, 6.99] | Medium Severity Vulnerability |
| [7.00, 8.99] | High Severity Vulnerability |
| [9.00, 10.00] | Critical Severity Vulnerability |

| Slope Interval | Gamma Multiplier |
|---|---|
| [0.00, 0.66] | 0.9 |
| [0.67, 0.83] | 0.8 |
| [0.84, 1.00] | 0.7 |

*FIG. 7*

| Slope Interval | Original Risk Score | Omega Multiplier |
|---|---|---|
| [0.50, 0.66] | [0, 64] | 0.95 |
| [0.67, 0.83] | [0, 64] | 0.94 |
| [0.84, 1.00] | [0, 64] | 0.93 |
| [0.50, 0.66] | [65, 85] | 0.92 |
| [0.67, 0.83] | [65, 85] | 0.91 |
| [0.84, 1.00] | [65, 85] | 0.90 |
| [0.50, 0.66] | [86, 95] | 0.89 |
| [0.67, 0.83] | [86, 95] | 0.88 |
| [0.84, 1.00] | [86, 95] | 0.87 |

*FIG. 8*

| CVSS Score Interval | Linear Model | Range |
|---|---|---|
| [0.00, 3.99] | $(\frac{10}{39}) \times [CVSS]$ | 0-1 |
| [4.00, 6.99] | $(\frac{10}{29}) \times [CVSS] - (\frac{11}{29})$ | 1-2 |
| [7.00, 7.99] | $(\frac{20}{9}) \times [CVSS] - (\frac{113}{9})$ | 3-5 |
| [8.00, 8.99] | $(\frac{50}{29}) \times [CVSS] - (\frac{355}{9})$ | 5-10 |
| [9.00, 9.49] | $(\frac{500}{49}) \times [CVSS] - (\frac{3520}{49})$ | 20-25 |
| [9.50, 10.00] | $(20) \times [CVSS] - (160)$ | 30-40 |

*FIG. 9*

RISK ASSESSMENT AND REMEDIATION

FIELD OF THE DISCLOSURE

The technical field of the present disclosure is computer security technology and, more specifically, computer security risk assessment and remediation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer security is becoming an increasingly complex issue. The number and variety of computer attacks to disrupt operations or steal data continue to grow, and the damage resulting from these computer attacks can be extremely harmful if not irrecoverable. Today, it is possible to assess the security landscape of a computer system and estimate the amount of risk in the computer system. The more accurate and detailed such risk assessment is, the more effective the remedial procedure can be. It will be helpful to improve existing risk assessment techniques.

BRIEF DESCRIPTION OF THE DRAWINGS

In the drawings:

FIG. 7 illustrates an example table that maps a Slope interval to a Gamma value.

FIG. 8 illustrates an example table that maps a Slope interval and an original risk score interval to an Omega value.

FIG. 9 illustrates an example table that maps a raw vulnerability score interval to an adjustment to an original risk score.

DETAILED DESCRIPTION

Figure 1:
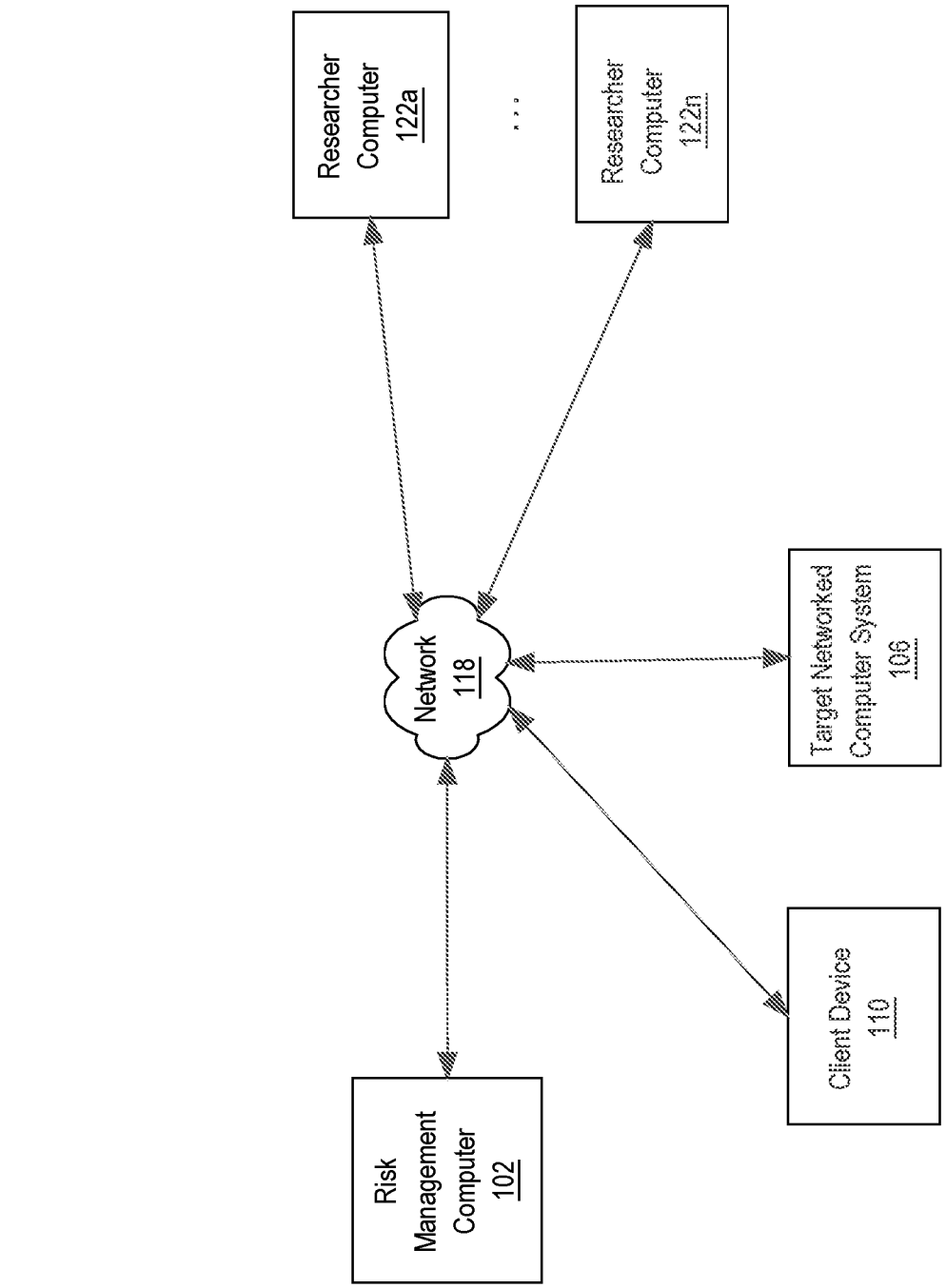
FIG. 1 illustrates an example networked computer environment in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer security risk indicates probability of occurrence of a disruptive event including but not limited to unauthorized access, unintended use, unrecognized dissemination, intrusive inspection, and unrestricted storage of code and data present on the networked computing machines. The code and data on such computing machines manifest through a variety of software configurations, which are collectively called a platform. Examples of such manifestations are the web, mobile, and host platforms. The software present on these platforms may represent a surface that is amenable to close examination in order to reveal the nature of their vulnerabilities. Examples surfaces for the web, mobile, and host platforms are web applications, operating systems, and network services, respectively. Risk assessment is the act of measuring and understanding the factors that positively or negatively impact the risk of such platform-specific surfaces. A risk scoring system is a mechanism through which the pertinent risk assessment is disseminated to the end-user.

As the number and variety of computer attacks increase, the requirement for identifying vulnerabilities in networked computer systems also heightens. It is helpful to identify such vulnerabilities through not only internal monitoring and testing but also external research and discovery by researcher computers. For example, a client device associated with a networked computer system could establish an engagement for risk assessment and remediation with a risk management server. The engagement can involve one or more listings, such as one associated with a URL or corresponding to a particular surface, for one or more platforms of the networked computer system. A penetration test simulating computer attacks to the networked computer system can then be conducted for each of the one or more listings by a plurality of researcher computers to identify vulnerabilities in the networked computer system.

In some embodiments, a risk management computer ("server") is programmed or configured with data structures and/or database records that are arranged to perform risk assessment and remediation based on the way the vulnerabilities are found and addressed during the engagement. Such risk assessment and remediation enable the client device to understand the current health of the networked computer system and take appropriate preventive or growth-inducing measures to improve the health of the networked computer system.

In some embodiments, the server is programmed to perform split-phase risk assessment, to first gauge the nature of one or more platforms of the networked computer system to provide a quick but reasonably accurate risk score, and then based on this high-level risk assessment, actively probe the target surfaces for discovering known and unknown vulnerabilities through the plurality of researcher computers. This sustained effort guided by researcher computers provides wider coverage and in-depth testing of the target surfaces and, together with the aforementioned high-level risk assessment, helps model the overall risk for the platforms. The first phase of high-level risk assessment performed is called pre-engagement risk assessment while the second phase of comprehensive risk assessment that typically starts once the engagement is established is called post-engagement risk assessment. For extensibility, the tasks performed by both assessments are pluggable in nature. That is, as the academic/industry R&D advances, the pre-engagement and post-engagement risk assessments may be able to add, modify, and remove tasks that would provide the necessary and sufficient risk assessment to the target network or system.

In some embodiments, for a given engagement with a client device associated with a networked computer system, the server is programmed to define an overall size and structure of the networked computer system, determine a qualitative strength of TLS/SSL protocol of the networked computer system, or detect re-routing of requesting to an IP address. The server is programmed to then compute a pre-engagement risk score for the networked computer system based on results of these measures. The server is programmed next to cause performance of a penetration test as part of the engagement by the plurality of researcher computers, in which a group of vulnerabilities may be found in the networked computer system.

In some embodiments, during or after the engagement, the server is programmed to determine a researcher computer cost describing a cost incurred by the plurality of researcher computers so far in the engagement as well as a vulnerability score associated with the group of vulnerabilities identified so far in the engagement. The server can also be configured to compute a resilience score reflecting a strength of the networked computer system against computer attacks so far in the engagement. The server is programmed to then compute a post-engagement risk score based on results of these measures. The server can be configured to calculate a post engagement risk score repeatedly during the engagement to better capture the progress of the engagement and state transition of the networked computer system. The server can then be configured to further use the post-engagement risk scores to establish benchmarks for the networked computer system or provide recommendations for improving the health of the networked computer system accordingly.

The risk management computer and related methods produce many technical benefits, as discussed throughout this application. The server provides an accurate and comprehensive view of the security landscape of a networked computer system through the identification of vulnerabilities in the networked computer system. The view covers not only the number and types of weaknesses of the networked computer system but also the effectiveness of the networked computer system in responding to these weaknesses through application of software patches. The view also contains fine-grained information that reflects detailed evolvement of the health and strength of the networked computer system over time. The server also causes effective measures to be taken to remediate detected security risk and to prepare for future computer attacks.

Embodiments are described in sections below according to the following outline:
1.0 EXAMPLE COMPUTING ENVIRONMENT
2.0 EXAMPLE COMPUTER COMPONENTS
3.0 FUNCTION DESCRIPTION
3.1 PRE-ENGAGEMENT RISK ASSESSMENT
3.2 POST-ENGAGEMENT RISK ASSESSMENT
3.3 RISK SCORE AGGREGATION, MODIFICATION, AND APPLICATION
4.0 EXAMPLE PROCESSES
5.0 IMPLEMENTATION EXAMPLE—HARDWARE OVERVIEW 1.0 Example Computing Environment FIG. 1 illustrates an example networked computer environment in which various embodiments may be practiced. FIG. 1 is shown in simplified, schematic format for purposes of illustrating a clear example and other embodiments may include more, fewer, or different elements.

In some embodiments, the networked computer environment comprises a risk management computer 102, a or target networked computer system 106, a client device 110, and a plurality of researcher computers 122a through 122n, which are communicatively coupled directly or indirectly via one or more networks 118; the designation 122n indicates that any number of such computers may be used in the system.

In some embodiments, the server 102 is programmed or configured with data structures and/or database records that are arranged to manage an engagement with the client device 110 associated with the target networked computer system 106 to identify vulnerabilities in the target networked computer system 106 through the plurality of researcher computers 122a through 122n. The server 102 can comprise a server farm, a cloud computing platform, a parallel computer, or any other computing facility with sufficient computing power in data processing, data storage, and network communication for the above-described functions.

In some embodiments, the client device 110 is programmed to communicate with the server 102 regarding the engagement to identify vulnerabilities in the target networked computer system 106. The client device 110 may comprise a desktop computer, laptop computer, tablet computer, smartphone, wearable device, or any other type of computing device that is capable of proper communication with the server 102 as well as adequate local data presentation, processing, and storage. The target networked computer system 106 can be any computer system comprising one or more interconnected components and exposed to the external network.

In some embodiments, each of the plurality of researcher computers 122a through 112n can also be any computer system that is capable of communicating with the server 102 and simulate computer attacks to the target networked computer system 106.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive a request from the client device 110 for an engagement to identify vulnerabilities in the target networked computer system 106. The engagement may contain one or more listings corresponding to different platforms or surfaces of the target networked computer system 106. The server is programmed to perform an initial assessment of the risk profile of the target networked computer system 106, which can lead to one or more vulnerability areas. The server can be configured to communicate the results of the initial assessment to the client device 110. The server 102 is programmed to then publish the listings and information obtained from the initial assessment to the plurality of researcher computers 122a through 122n.

In some embodiments, subsequently, the server 102 is configured to receive progress reports from one or more of the plurality of researcher computers 122a through 122n regarding simulated computer attacks and vulnerabilities found in the target networked computer system 106. The server 102 is also configured to transmit status updates to the client device 110 and/or the target networked computer system, which can be programmed to take remediate measures to address the vulnerabilities found in the target networked computer 106 by the plurality of researcher computers 122a through 122n. Based on the way the vulnerabilities are found and addressed, the server 102 is programmed to perform post-engagement assessments of the risk profile of the target networked computer system 106. The server 102 is programed to further communicate the results of the post-engagement assessments to the client device 110 and facilitate implementation of proper measures to improve the overall health of the target networked computer system 106.

2.0 Example Computer Components

Figure 2:
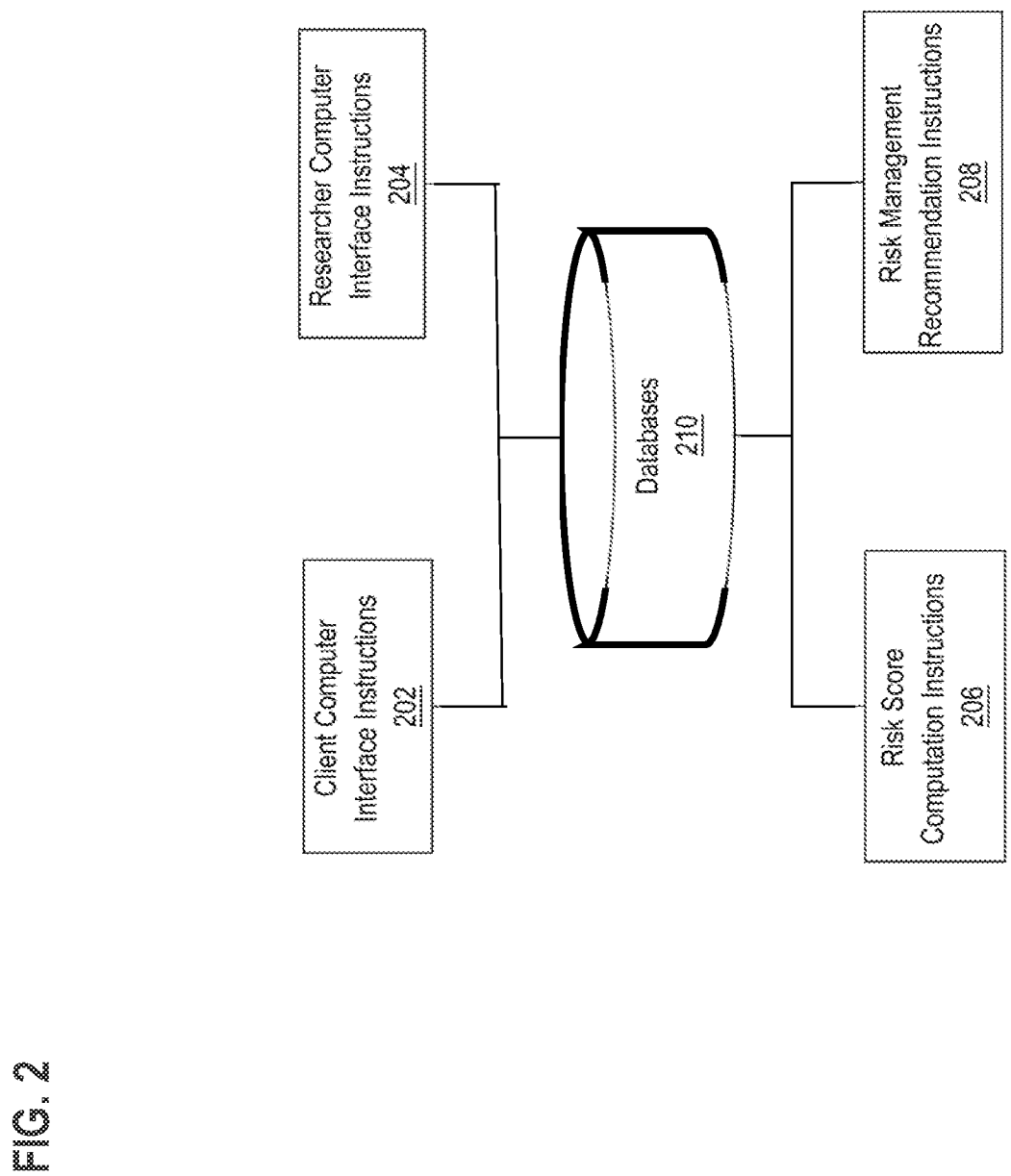
FIG. 2 illustrates example components of a risk management computer in accordance with the disclosed embodiments.

FIG. 2 illustrates example components of a risk management computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise a client computer interface component 202, researcher computer interface component 204, a risk score computation component 206, a risk management recommendation component 208, and a database module 210.

In some embodiments, the client computer interface component 102 is programmed or configured to communicate with the client device 110. The communication can include receiving a request for an engagement to identify vulnerabilities in the associated target networked computer system 106, transmitting results (e.g., risk scores) of post-, current, or post-engagement risk assessment to the client device 110, transmitting updates of progress of the engagement, or transmitting recommendations for taking specific measure to eliminate found vulnerabilities and counter future computer attacks.

In some embodiments, the researcher computer interface 204 is programmed or configured to communicate with one or more of the plurality of researcher computers 122a through 122n. The communication can include transmitting a notification of new listings associated with the target networked computer system 106 or receiving progress reports of simulating computer attacks to the target networked computer system 106 or identifying vulnerabilities in the target networked computer system 106.

In some embodiments, the risk score computation component 206 is programmed or configured to compute a risk score from assessing the risk profile of the target networked computer system 106 before, during, or after the engagement. The pre-engagement risk assessment is mainly based on an evaluation of various aspects of the target networked computer system 106, while any subsequent risk assessment is also based on an evaluation of the efforts made by the plurality of researcher computers 122a through 122n in simulating computer attacks to and identifying vulnerabilities in the target networked computer system 106.

In some embodiments, the risk management recommendation component 208 is programmed or configured to prepare recommendations for patching the discovered vulnerabilities that may improve the resilience of the target networked computer system 106 for future adversarial attacks based on the results of the risk assessments. The recommendations can help identify certain remedial measures in response to found vulnerabilities or further preventative measures to protect the target networked computer system 106 from future computer attacks. The recommendations can also help determine the nature and timing of future engagements to identify vulnerabilities and assess security risk in the target networked computer system 106 on an ongoing basis.

In some embodiments, the database module 210 is programmed or configured to manage relevant data structures and store relevant data, such as data related to hardware and software configurations of the target networked computer system 106 and the plurality of researcher computers 122a through 122n, capabilities and skills of the plurality of researcher computers 122a through 122n and associated researchers, details of the engagement, simulated computer attacks performed by the plurality of researcher computers 122a through 122n, vulnerabilities found in the target networked computer system 106, risk scores computed for the target networked computer system 106, or recommendations for improving the health of the target networked computer system 106.

3.0 Functional Description

In some embodiments, the server 102 is programmed to provide a first-order, high-level, and reconnaissance-based risk assessment in pre-engagement risk assessment. Specifically, the server 102 is configured to provide key insights into the underlying platform-specific structure such as the approximate attack surface size over mobile, host and web surfaces. Potential security vulnerabilities over such surfaces are discovered by applying automated suspected vulnerability detection systems and programmed scanning tools known to someone of ordinary skill in the art. Subsequently, discovered potential vulnerabilities are weighed and included in the overall risk score. Separately, through accounting of pertinent historical breach datasets, publicly open ports and services are assessed towards the risk exposure for different platform-specific surfaces. Such contextual datasets may be collected from a variety of sources such as in-house hypotheses-based, empirically-derived results, academic research, or industry best practices.

In some embodiments, the server 102 is programmed to apply various systems and tools in pre-engagement risk assessment. A first example is an attack surface size estimation sub-system: This sub-system helps estimate the pre-engagement risk by defining the overall size and structure of a platform-specific attack surface. This sub-system is generally designed to reasonably quickly converge to the overall silhouette of the surface, thereby, setting up the stage for other sub-systems to operate. A second example is a TLS/SSL quality evaluation sub-system. This sub-system informs the pre-engagement risk assessment by helping determine the qualitative strength of the implemented TLS/SSL protocol. In particular, based on the deployed configuration of cryptographic algorithms and other related factors, this sub-system helps determine the quality of the said protocols and their ability to secure information. A third example is a zone transfer/vulnerability scan sub-system. This sub-system detects unauthorized or illegal re-routing of requests to an IP address. Such a re-routing is achieved through subverting of the Domain Name System ("DNS") service and could result in a variety of malicious outcomes. Separately, this sub-system is also responsible for administering and managing the process of scanning a target computer, system or network for vulnerabilities.

In some embodiments, the server 102 is programmed to further build on the insights gleaned from the pre-engagement risk assessment, and, separately, provide complementary insights in post-engagement risk assessment. Specifically, the server 102 is programmed to enable the group of carefully vetted security researcher computers 122a through 122n and associated researchers to deeply examine or penetrate the pertinent platform-specific surfaces. Such a close inspection or testing would likely manifest a variety of surface-specific vulnerabilities, each of which would require a reasonable discovery effort.

In some embodiments, the server 102 is programmed to apply various systems and tools in post-engagement risk assessment. A first example is a host attack surface evaluation sub-system. This sub-system helps determine the nature of vulnerabilities, among other factors, that are specific to the host platform. A second example is a mobile attack surface evaluation sub-system. This sub-system helps determine the nature of vulnerabilities, among other factors, that are specific to the mobile platform. A third example is a web attack surface evaluation sub-system. This sub-system helps determine the nature of vulnerabilities, among other factors, that are specific to the web platform.

In some embodiments, upon discovery of surface-specific vulnerabilities, the server 102 is programmed to cause application of relevant software patches to the platform under evaluation. The server 102 is further programmed to measure the patch time-to-effect and the effectiveness of the applied software patches to assess the impact of the applied software patches on the temporally evolving risk assessment.

In some embodiments, the server 102 is further programmed to estimate the inherent strength or the resilience of target surfaces to select attack vectors. As discussed above, during the pre-engagement risk assessment, the scope of a target surface is estimated, the TLS/SSL quality of the target surface is measured, and a vulnerability scan is applied while also ensuring that the policy-based zone transfer susceptibility detection mechanism is actively present. Insights from these processes are subsequently provided to a resilience estimation model. Separately, for the three types of targeted surfaces, vulnerability time-to-discovery, estimated researcher computer cost, vulnerability severity distribution, and patch effectiveness and time-to-effect, are measured during the post-engagement risk assessment. Some of these insights are provided to the resilience estimation model, which, in combination with pre-engagement risk insights, generates platform-specific resilience insights.

In some embodiments, the server 102 is programmed to take the output of the resilience estimation model and generate temporally varying platform-specific risk scores in a given interval (e.g. a risk score interval of [0, 100]), where lower values indicate lower risk and higher values mean higher risk. Since the risk scores generated are temporally varying, each target system is given an initial score that subsequently serves as a baseline or benchmarking risk score against which future risk scores may be assessed. Such assessments may be provided as part of continuous engagement with the client device 110 in order for them to help understand and mitigate the detected security risk. Intuitively, when the vulnerabilities exposed throughout the one or more engagements are mitigated over time, the risk scores should approach the lower limit. However, change in the underlying structure of the platform and manifestation of the new vulnerabilities, among other factors, may cause the risk score to approach higher value. At that instant, it is then more urgent to address the security issues to minimize disruption to the network or system.

In some embodiments, the server 102 is programmed to compute a specific overall risk score Risk Score$_{i,\ t}$ by weighting the outputs from the individual sub-systems, such as the attack surface size estimation sub-system, TLS/SSL quality evaluation sub-system, zone transfer/vulnerability scan sub-system, host attack surface evaluation system, mobile attack surface evaluation sub-system, or web attack surface evaluation sub-system noted above, that are part of pre-engagement and post-engagement risk assessments, as follows, $$\text{Risk } Score_{i,t} = u \cdot G\left[\prod_{j=1}^{N} w_j \cdot f_j(X_j) \middle| \sum_{j=1}^{N} w_j \cdot f_j(X_j)\right] \quad (1)$$

where the aforementioned symbols have the following meanings:

Risk Score$_{i,\ t}$: The overall computed risk score ∈[Lower Limit, Upper Limit] for a given target network, device or system i (e.g., the client device 110 and associated networked computer system 106) at time instant t G: Function that defines the resilience estimation model's operational behavior u: Principled weighting factor applied to the aforementioned function G $f_j$: Function that defines the operational behavior of pre-engagement or post-engagement sub-system j $w_j$: Principled weighting factor applied to the aforementioned sub-system j $X_j$: Set of inputs for the aforementioned sub-system j such that ∀x∈X, x is a separate input instance N: Number of pre-engagement and post-engagement sub-systems i, j: Iterator variables

|: Selection choice operator indicating a selection choice that expresses the risk score computation as either a sum or product of terms with appropriate weights ·: Multiplication operator The risk score Risk Score$_{i,\ t}$ defines the overall risk score on a per target basis which is jointly computed on the weighted combination of individual functions $f_j$ that encapsulate the operational behaviors of the different pre-engagement and post-engagement assessment sub-systems. The output of such functions is inputted to the weighted function G that defines the resilience estimation model. The individual pre-engagement and post-engagement functions may have varying number of inputs, and that such functions are expressed in two separate combinatorial forms (i.e. in the product and sum form), either of which or any combination thereof may be applicable. The overall risk score may be amenable to select normalization techniques for alignment with different scales and ranges.

Furthermore, the server 102 can be configured to incorporate into the risk score risk score Risk Score$_{i,\ t}$ noted above with patch effectiveness and patch time-to-effect metrics to provide an in-depth understanding of the post-engagement risk, as further discussed below. Such a nuanced understanding of risk associated with a system or network can be combined with complementary results generated from the pre-engagement risk assessment, to provide a comprehensive view of the risk.

3.1 Pre-Engagement Risk Assessment

In some embodiments, the server 102 is programmed to counter the danger of risk score underflow or overflow from having fewer or more vulnerabilities found at different scoring thresholds. A raw vulnerability score or vulnerability level, such as a score under the Common Vulnerability Scoring System ("CVSS score"), can be computed for each vulnerability found in a listing associated with a target platform. Originally, discrete-sized buckets with lower and upper thresholds were used to classify the sum of CVSS scores for the target platform and different buckets were treated differently. The server 102 can instead be configured to take the logarithm of the sum of raw vulnerability scores to further facilitate differentially weighing the difference in the volume and severity of vulnerabilities found at the given lower or upper scoring threshold. Therein, by applying the logarithm operation, an adjustable scaling of a vulnerability factor indicating the overall vulnerability volume and severity, as further discussed below, over different thresholds can be more easily achieved. Furthermore, this adjustable scaling functionality obviates the need for discretizing the bucket intervals. The buckets can be fitted in a manner that the log-of-sum value does not reach a cut-off. Specifically, the cut-off can be a user-defined value based on the sum of all CVSS values for a target listing and can may change from listing to listing. Given the cut-off, the number and boundaries of the buckets can be determined so the volume and severity of the buckets are more or less balanced. The vulnerabilities found beyond that cut-off for the log-of-sum value are not considered for further use as the vulnerability factor is assumed to have reached its maximum value.

For example, when a listing has five vulnerabilities with CVSS scores of {5, 7, 9, 3, 10}, the sum of the CVSS scores is: 34. Since each CVSS score is in the range of 0 and 10, the maximum sum possible in the above example is 50. The vulnerability factor corresponding to this maximum sum can be computed as $LOG_{10}(50)=1.6987$. This value or a certain percentage thereof can be used as the cut-off. The vulnerability factor for the current sum can be computed as $LOG_{10}(34)=1.5314$. The difference between the maximum sum of 50 and the current sum of 34 is 16. This difference can be compensated through four vulnerabilities each having a CVSS score of 4, two vulnerabilities of each having a CVSS score of 8, and so on. Assigning a weight to this difference for scaling the vulnerability factor is related to the number of vulnerabilities it might take in that listing to reach that maximum sum. This approach presents a tradeoff between CVSS scores and the number of vulnerabilities towards this difference (of 16 in the above example).

In some embodiments, the server 102 is programmed to express the pre-engagement risk score $S_{PRE,i}$ that factors in the surface-specific susceptibility of zone transfer, number of undesirable services found, number and severity of vulnerabilities found, size of the target surface, and SSL strength, as follows, $$S_{PRE,i}=(1-\alpha_i)\cdot[U_i\cdot 30+V_i\cdot 45+A_i\cdot 20+L_i\cdot 5]+(\alpha_i)\cdot[100] \quad (2)$$

where the aforementioned symbols have the following meanings, $S_{PRE,i}$: The pre-engagement risk score for target i
$\alpha_i$: Zone transfer susceptibility flag for target i
$U_i$: Number of undesirable services found over target i
$V_i$: Number and severity of vulnerability found over target i
$A_i$: Size of the target i
$L_i$: SSL strength score for target i and where the weights of 30, 45, 20, and 5 assigned to $U_i$, $V_i$, $A_i$, and $L_i$, respectively, are notional and depend on the underlying distribution of data acquired from the engagement with the target client. In the event of DNS resolution unavailability, the zone transfer susceptibility flag $\alpha_i$ is set to zero in the Equation (2). Furthermore, when SSL encryption is not available then the SSL strength score $L_i$ is set to zero and its assigned weight is redistributed to other factors. The updated pre-engagement risk score, $S_{PRE,i}$, with above considerations is as follows, $$S_{PRE,i}=[U_i\cdot 32+V_i\cdot 47+A_i\cdot 21] \quad (3)$$

Where the aforementioned symbols have the following meanings, $S_{PRE,i}$: The DNS and SSL removed pre-engagement risk score for target i
$U_i$: Number of undesirable services found over target i
$V_i$: Number and severity of vulnerability found over target i
$A_i$: Size of the target i and where the weights of 32, 47, and 21 assigned to $U_i$, $V_i$, and $A_i$, respectively, are notional and depend on the underlying target client acquired data distribution.

3.2 Post-Engagement Risk Assessment

In some embodiments, the server 102 is programmed to estimate the amount of online effort expended by researcher computers 122a through 122n when discovering vulnerabilities in the target networked computer system 106. This estimation defines the researcher computer cost as stipulated through the corresponding online effort. In general, when the listings are made available for vulnerability discovery purposes, the researcher computers 122a through 122n start by breadth-wise discovering vulnerabilities over the listings' surfaces followed by use of specialized tools, such as automatic parameter fuzzing systems, to converge to a few targets, before narrowing it down to a vulnerability target that culminates into the discovery of the said vulnerability. Thus, such researcher computer behavior could be characterized through a power law or a negative exponential distribution. Not all researcher computer costs would be characterized through such characterization, however, as deviations from the overall normative behavior representing outliers may exist.

Figures 3, 4, 5:
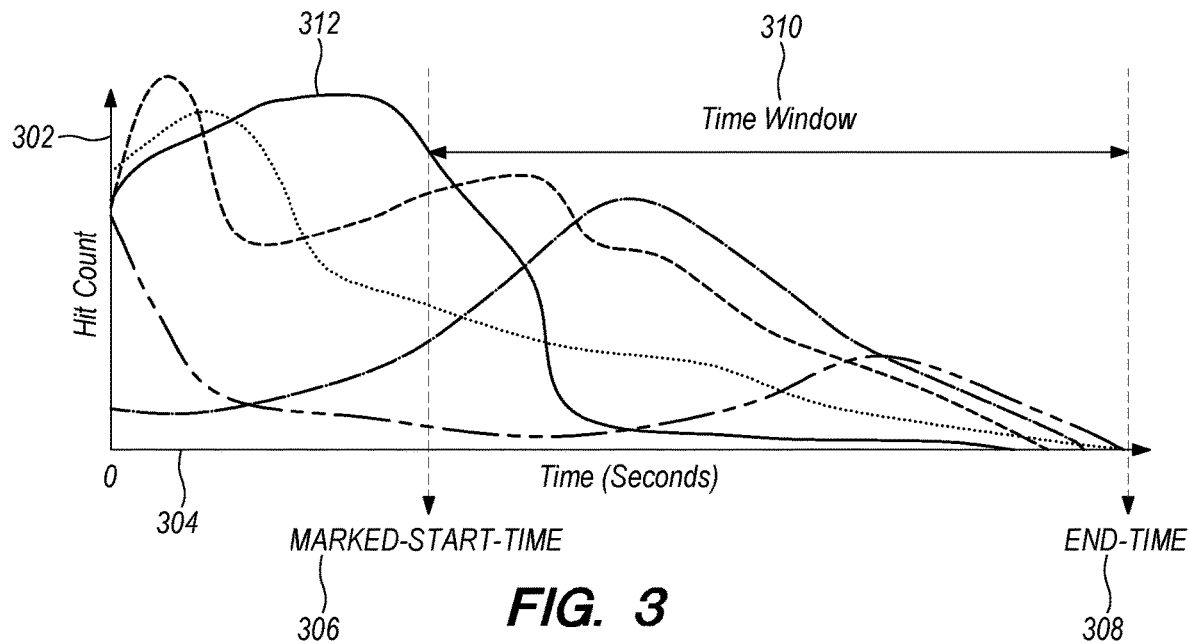
FIG. 3 illustrates a characterization of online effort expended by researcher computers.
FIG. 4 illustrates an example table that maps severity levels of found vulnerabilities to corresponding multipliers for effective computation of a researcher computer cost.
FIG. 5 illustrates an example categorization of vulnerability severity.

FIG. 3 illustrates a characterization of online effort expended by researcher computers 122a through 122n. The X-axis 304 has the measurable units in time while the Y-axis 302 indicates the total computer attack or hit count by all available researcher computers 122a through 122n for a given listing (or asset), a given platform, or other components of the networked computer system 106. Each curve 312 represents the research trajectory of one of the researcher computers 122a through 122n. The dotted-lines 306 and 308 respectively marked as MARKED-START-TIME and END-TIME indicate the times within which the hits towards a listing are counted. The difference in MARKED-START-TIME 306 and END-TIME 308 corresponds to a time-window 310 within which the researcher computer cost can be measured in a cumulative sense over a given listing.

In some embodiments, the server 102 is programmed to compute the researcher computer power $C_i$ based on the concept of electric power as a ratio of a hit count $H_i$ and the absolute difference of the END-TIME $V_i$ and the MARKED-START-TIME $T_i$ as follows, $$C_i = \frac{B_i}{|V_i - T_i|}, \quad (4)$$

$$|V_i - T_i| = \begin{cases} |V_i - T_i|; & \text{if } |V_i - T_i| < \mu_{V_i - T_i} + 2\sigma_{V_i - T_i} \vee \\ & |V_i - T_i| > \mu_{V_i - T_i} - 2\sigma_{V_i - T_i} \\ \mu_{V_i - T_i} + 2\sigma_{V_i - T_i}; & \text{if } |V_i - T_i| = \mu_{V_i - T_i} + 2\sigma_{V_i - T_i} \\ \mu_{V_i - T_i} - 2\sigma_{V_i - T_i}; & \text{if } |V_i - T_i| = \mu_{V_i - T_i} - 2\sigma_{V_i - T_i} \\ \alpha; & \text{if } |V_i - T_i| > \mu_{V_i - T_i} + 2\sigma_{V_i - T_i} \\ \beta; & \text{if } |V_i - T_i| < \mu_{V_i - T_i} - 2\sigma_{V_i - T_i} \end{cases}$$

wherein $\sigma_{Vi\text{-}Ti}$, $\mu_{Vi\text{-}Ti}$, $\alpha$, and $\beta$ are positive integers, with $\sigma_{Vi\text{-}Ti}$ and $\mu_{Vi\text{-}Ti}$ being the standard deviation and mean of the time window over different listings associated with a target platform or over different target platforms.

Specifically, the value of denominator $|V_i-T_i|$ is bounded by parameters $(\mu_{Vi\text{-}Ti}+2\sigma_{Vi\text{-}Ti})$ and $\alpha$ from above and $(\mu_{Vi\text{-}Ti}-2\sigma_{Vi\text{-}Ti})$ and $\beta$ from below, respectively. These bounds help determine the final duration of the time window. That is, when $((|V_i-T_i|<(\mu_{Vi\text{-}Ti}+2\sigma_{Vi\text{-}Ti}))$ or $(|V_i-T_i|>(\mu_{Vi\text{-}Ti}-2\sigma_{Vi\text{-}Ti})))$ then value of the duration is set to $(|V_i-T_i|)$ otherwise when $(((|V_i-T_i|>(\mu_{Vi\text{-}Ti}+2\sigma_{Vi\text{-}Ti}))$ or $(|V_i-T_i|<(\mu_{Vi\text{-}Ti}-2\sigma_{Vi\text{-}Ti})))$ then final value of the duration is set to $\alpha$ or $\beta$, respectively. Also, when $((|V_i-T_i|=(\mu_{Vi\text{-}Ti}+2\sigma_{Vi\text{-}Ti}))$ or $(|V_i-T_i|=(\mu_{Vi\text{-}Ti}-2\sigma_{Vi\text{-}Ti})))$ it's the final value of the duration is set to $(\mu_{Vi\text{-}Ti}+2\sigma_{Vi\text{-}Ti})$ or $(\mu_{Vi\text{-}Ti}-2\sigma_{Vi\text{-}Ti})$, respectively. These bounding parameters enable measuring the impact of researcher computer cost for different configurations and scenarios. For reference purposes, $\alpha$ and $\beta$ could be set to 43,200 (or 12 hours of time expressed in seconds) and 300 (5 minutes of time expressed in seconds) to address the restricted researcher computer discovery time window use-case.

In some embodiments, the server 102 is programmed to compute researcher computer efficiency $E_i$ based on the concept of mechanical efficiency as the ratio of the severity of found vulnerabilities $D_i$ and the researcher computer power $C_i$ as follows, $$E_i = \frac{D_i}{C_i}; C_i \neq 0 \quad (5)$$

where $D_i$ can be expressed as an aggregate of the CVSS values of the found vulnerabilities, as further discussed below.

In some embodiments, the server 102 is configured to normalize the researcher computer efficiency $E_i$. First, the server 102 is programmed to further compute the overall sample average $\mu_E$ and sample standard deviation $\sigma_E$ of the researcher computer efficiency over all the platforms associated with the target networked computer system 106 as follows, $$\mu_E = \frac{\sum_{i=1}^{N} E_i}{N} \quad (6)$$

$$\sigma_E = \sqrt{\frac{\sum_{i=1}^{N} (E_i - \mu_E)^2}{N-1}} \quad (7)$$

These statistics correspond to measures of central tendency and dispersion and are computed to understand the nature of the underlying distribution for one listing considering all the vulnerabilities found in the target networked computer system 106. Considering the statistically significant set of available samples instead of the full population allows for reasonably accurate values from Equations (6) and (7) while also being comparatively computationally inexpensive.

In some embodiments, the server 102 is programmed to next compute the standardized computer efficiency $S_i$ as the deviation of $E_i$ from the $\sigma_E$ normalized by $\sigma_E$ as follows, $$S_i = \frac{E_i - \mu_E}{\sigma_E}; S_i \in R \quad (8)$$

In some embodiments, the server 102 is programmed to further bound the corner-case values of $S_i$ (i.e. when it either approaches $-\infty$ or $+\infty$) to a fixed value. The server 102 is programmed to next compute the maximum value M of the $S_i$ distribution as follows, $$M = \max_{\forall i}[S_i] \quad (9)$$

In some embodiments, the server 102 is programmed to further compute a shifted, standardized researcher computer efficiency $\underline{S}_i$ as $S_i$ incremented by the maximum value M as follows, $$\overline{S}_i = M + S_i \quad (10)$$

Shifting the $S_i$ distribution to the positive scale recovers the nature of the researcher computer efficiency $E_i$ as a positive-valued quantity.

In some embodiments, the server 102 is programmed to compute the sum $\tilde{S}_i$ of the contributing $S_i$ values as follows, $$\tilde{S} = \Sigma_{i=1}^{N} \overline{S}_i \quad (11)$$

In some embodiments, the server 102 is programmed to next compute the weighted, shifted, standardized researcher computer efficiency $P_i$ for each $S_i$ distribution as the ratio of the shifted, standardized researcher computer efficiency $S_i$ and the sum $\tilde{S}_i$ follows, $$P_i = \frac{\tilde{S}_i}{\tilde{S}}; \tilde{S} \neq 0 \quad (12)$$

One difference between the initial dispersion-based standardization and subsequent weight adjustment is that dispersion-based standardization helps construct a normal distribution which can be reasoned with using different distribution parameters (e.g. height, variation about the mean, etc.), while the weight adjustment allows for the individual shifted values to normalize within a specified interval range across different listings or that particular listing.

In some embodiments, the server 102 is programmed to compute the scaled, weighted, standardized researcher computer efficiency $Q_i$ as the weight $P_i$ multiplied by a scale factor $\beta$ as follows, $$Q_i = \beta \cdot P_i; Q_i \in R^+ \quad (13)$$

For reference purposes, the current value of this factor $\beta$ is can be set to 100 in order to move a post-engagement risk score from the interval of [0.0, 1.0] to the interval of [0.0, 100.0].

Thus far, each researcher computer efficiency metric measures the piecewise vulnerability discovery efficiency of researcher computers for the target listing by considering cumulative vulnerability contributions. Researcher computer cost can be viewed as researcher computer inefficiency, an inverse of researcher computer efficiency. In some embodiments, the server 102 is programmed to compute the researcher computer cost $W_i$ as the difference of a factor $\beta$ and the researcher computer efficiency $Q_i$ as follows, $$W_i = \beta - Q_i; W_i \in R^+ \quad (14)$$

FIG. 4 illustrates an example table that maps severity levels of found vulnerabilities to corresponding multipliers for effective computation of a researcher computer cost. In some embodiments, the server 102 is programmed to adjust the severity of found vulnerabilities $D_i$ based on the table to help ensure each the researcher computer efficiency metric would not have extremely small values corresponding to a poor volume or severity level of found vulnerabilities, which in turn helps ensure that the researcher computer cost $W_i$ does not have extremely large values. In FIG. 4, the first column 414 indicates the raw vulnerability scores, such as CVSS scores that fall in the range of [0.0, 10.0], and the second column 416 indicates the multipliers for the severity of found vulnerabilities $D_i$. For example, when an aggregate CVSS score for the vulnerabilities found in a target platform falls in the range of [0.00, 0.99], the aggregate CVSS score is multiplied by 2 as the value of the severity of found vulnerabilities $D_i$. Alternatively, each CCVS score of a found vulnerability can be multiplied by the corresponding multiplier value and the aggregate multiplied CCVS score is then used as the value of the severity of found vulnerabilities $D_i$. As the CVSS score approaches the maximum, the corresponding multiplier scales up by several orders of magnitude. Such a rapid scale-up helps ensure each researcher computer efficiency metric value is not small and meaningfully conveys higher urgency when the CCVS score approaches the maximum.

In addition to the researcher computer cost $W_i$, other components, such as the distribution of found vulnerabilities, patch remediation time, and patch efficacy, can also help compute the overall post-engagement risk score. In some embodiments, the server 102 is programmed to first categorize the vulnerabilities in determining how the vulnerabilities are distributed. FIG. 5 illustrates an example categorization of vulnerability severity. The first column 514 indicates the raw vulnerability scores, such as CVSS scores, and the second column 518 indicates the assigned labels or classes, which are low, medium, high, and critical. Such a categorization is broader than the fine-grained interval-based categorization illustrated in FIG. 4, and thus can admit wider intervals for the raw vulnerability scores.

In some embodiments, the server 102 is programmed to further compute the vulnerability factor $V_i$ based on the vulnerabilities categorization discussed above as below, $$V_i = \begin{cases} 100; & ((Num_{Critical} > 1) \text{ OR } ((Num_{Critical} > 0) \text{ AND } (Num_{High} > 0))) \\ 90; & (Num_{Critical} > 0) \\ \text{Min}(70, 60 + Num_{Medium} \cdot 10 + Num_{Low} \cdot 5); & (Num_{High}) \\ \text{Min}(40, Num_{Medium} \cdot 10 + Num_{Low} \cdot 5); & (\text{Otherwise}) \end{cases} \quad (15)$$

Specifically, the vulnerability factor $V_i$ is assigned a value which is either 100, 90, Min(70, 60+$Num_{Medium}$·10+$Num_{Low}$·5), or Min(40, $Num_{Medium}$·10+$Num_{Low}$·5) based on the applicable conditional clause for the number and severity classification of vulnerabilities found for the target listing. The constants in Equation (15) are illustrative and other values can be used. By capturing both the severity classification and the number of found vulnerabilities, the vulnerability factor $V_i$ is a better representation of the distribution of found vulnerabilities than the initial categorization into several classes. An alternate description of computing the vulnerability factor $V_i$ is to model it as an interval-based linear function of CVSS as illustrated in FIG. 9 and paragraphs [0114] and [0115].

In some embodiments, the server 102 is then programmed to transmit the vulnerability factor $V_i$ to the client device 110 representing the result of an initial post-engagement security assessment for the client platform. In response to the vulnerability factor $V_i$, the client device 110 may create or select appropriate software patches to mitigate the found vulnerabilities. Alternatively, the server 102 can be configured to create or select the appropriate software patches on behalf of the client device 110. Subsequently, the server 102 is programmed to evaluate the timeliness of applying the software patches and effectiveness of the applied software patches to determine the resilience of the client platform against hacker attacks.

The server 102 is programmed to next classify each patch remediation time, which can be defined as the amount of time it takes from the selection to the application of a software patch, into several classes and compute the size of each class over all the applied software patches. The server 102 is configured to further compute a patch remediation time score $R_{RemediationTime, i}$ based on the patch remediation time classification as follows, $$R_{RemediaitonTime,i} = \begin{cases} 50; & \begin{pmatrix} (RemTime_{High} = 0) \text{ AND} \\ (RemTime_{Medium} = 0) \text{ AND} \\ (RemTime_{Low} = 0) \end{pmatrix} \\ 100; & (RemTime_{High} > 30) \\ 90; & (RemTime_{High} > 14) \\ 75; & \begin{pmatrix} (RemTime_{High} > 7) \text{ AND} \\ (RemTime_{High} < 14) \text{ AND} \\ (RemTime_{Medium} > 60) \end{pmatrix} \\ 50; & \begin{pmatrix} (RemTime_{Medium} > 30) \text{ OR} \\ (RemTime_{Low} > 120) \end{pmatrix} \\ 25; & (RemTime_{Low} > 60) \\ 0; & (\text{Otherwise}) \end{cases} \quad (16)$$

Specifically, a patch remediation time is classified as low, medium, and high to piecewise assess the impact of software patches by class. For example, a patch remediation time of one, three, and seven days can be classified as low, medium, and high, respectively. The patch remediation time score $R_{RemediationTime, i}$ is then assigned a value 50, 100, 90, 75, 50, 25, or 0 based on the applicable conditional clause that depends on the remediation time it took for the client device 110 to patch the discovered vulnerabilities in the target networked computer system 106. The constants in Equation (16) are illustrative and other values can be used.

In some embodiments, the server 102 is programmed to further to compute a patch efficacy score of each software patch used to address one or more of the found vulnerabilities and calculate an average $PatchEfficacy_{Average}$ of such scores. Specifically, patch effectiveness can be measured through a combination of effort it takes to re-discover the same vulnerability that was previously discovered on that listing and whether the same vulnerability exists post-patch. The server 102 is configured to then compute a patch efficacy score $R_{PatchEfficacy, i}$ based on the average patch efficacy score $PatchEfficacy_{Average}$ as follows, $$R_{PatchEfficacy,i} = \begin{cases} 50; & (PatchEfficacy_{Average} = 0) \\ 100; & (PatchEfficacy_{Average} \leq 50) \\ 90; & (PatchEfficacy_{Average} \leq 60) \\ 75; & (PatchEfficacy_{Average} \leq 70) \\ 50; & (PatchEfficacy_{Average} \leq 80) \\ 25; & (PatchEfficacy_{Average} \leq 90) \\ 10; & (PatchEfficacy_{Average} \leq 95) \\ 0; & (\text{Otherwise}) \end{cases} \quad (17)$$

Specifically, each patch efficacy score is scaled to be between [0.0, 100]. The patch efficacy score $R_{PatchEfficacy, i}$ is then assigned a value 50, 100, 90, 75, 50, 25, 10, or 0 based on the applicable conditional clause that depends on the effectiveness of applied software patches. The constants in Equation (17) are illustrative and other values can be used.

In some embodiments, the server 102 is programmed to further compute a resilience score $R_{overall, i}$ based on the patch remediation time score $R_{RemediationTime, i}$ and the patch efficacy score $R_{PatchEfficacy, i}$ as follows, $$R_{Overall,i} = \left[ \frac{R_{RemediationTime,i} + R_{PatchEfficacy,i}}{2} \right] \quad (18)$$

By combining the researcher computer cost $W_i$, vulnerability factor $V_i$, and/or the resilience score $R_{overall, i}$ two post-engagement risk scores can be computed. In some embodiments, the server 102 is programmed to compute the first post-engagement risk score, the hacker resistance score $R_{resistance, i}$, as a weighted average of the researcher computer cost $W_i$ and the vulnerability factor $V_i$ as follows, $$R_{Resistance,i} = \left[ \frac{W_i \cdot a + V_i \cdot b}{(a+b)} \right] \quad (19)$$

Specifically, the weights a and b can be integers to reflect the impact of quantities captured in $W_i$ and $V_i$, (i.e., a CVSS score associated with a listing, computer attacks or hits made against a listing, cumulative elapsed time for the hits, etc.). For example, (a=10, b=7), (a=7, b=10), (a=7, b=15), (a=7, b=20), and (a=7, b=50) progressively give higher weightage to the vulnerability factor $V_i$ over the researcher computer cost $W_i$ in order to convey the impact of vulnerabilities in a more meaningful fashion. The hacker resistance score $R_{Resistance, i}$ conveys the resistance to hacker attacks. For example, when a listing has been hit by computer attacks for a period of 43,200 seconds yielding numerous vulnerabilities with high severity, that listing would have lower resistance to hacker attacks compared to a different listing that yields fewer vulnerabilities with low severities.

In some embodiments, the server 102 is programmed to compute the second post-engagement risk score $S_{POST, i}$ as a weighted average of the researcher computer cost $W_i$, the vulnerability factor $V_i$ and the resilience score $R_{overall, i}$ as follows, $$S_{POST,i} = \left[ \frac{W_i \cdot a + V_i \cdot b + R_{Overall,i} \cdot c}{(a+b+c)} \right] \quad (20)$$

Specifically, the weights a, b, and c may be appropriately configured to alter the individual score contributions and impact of these scores on the second post-engagement risk score $S_{POST, i}$.

3.3 Risk Score Aggregation, Modification, and Application

A risk score model comprising the risk scores discussed above provide a general view of the overall risk score solution, and they can be refined to serve a variety of functional- and business-related use cases. In some embodiments, the risk score model enables the comparison of risk scores between different systems, networks or devices within a given industry sector. The score model is amenable to computing the risk score over a set of clients in a relativized sense or on a per client basis in a piecewise sense. In particular, the risk score model is oblivious to the underlying dataset in the sense that if the dataset provided to the risk score model comprises of vulnerabilities and depth coverage data spread over different clients then the risk score produced can be relativized over all the clients, and conversely if the dataset contains vulnerabilities and depth coverage data limited to a particular client then the risk score is computed for that particular client only. For the purpose of indistinguishability and consistency between the relativized and piecewise risk score model computing approaches, the server 102 can be programmed to check whether the conclusions drawn from computing the risk scores for a set of clients in a relativized manner are similar to the conclusions inferred from computing the risk score in a piecewise manner for each client in that set.

As discussed above, a raw vulnerability score, such as a CVSS score, can be computed for each vulnerability found in a listing associated with a target platform. For example, each such listing could correspond to a URL on a web platform. An aggregation of the raw vulnerability scores to a higher level, such as the sub-domain or domain level, can provide the client device 110 with an overall view of the computer security landscape of the target platform. In some embodiments, the server 102 is programmed to apply a minimization operation over the set of risk scores computed for different listings. The result conveys the lowest risk score over the entire set of web assets under test, or the most effort required to break into those web assets. Therefore, it is by definition the strongest link in the entire chain of presumably secure web-assets. Conversely, the server 102 is programmed to apply a maximization operation to identify the weakest link in the entire chain. In other embodiments, the server 102 is configured to apply other aggregation operations, such as an average operation, to offer different views of the security landscape.

Figure 6:
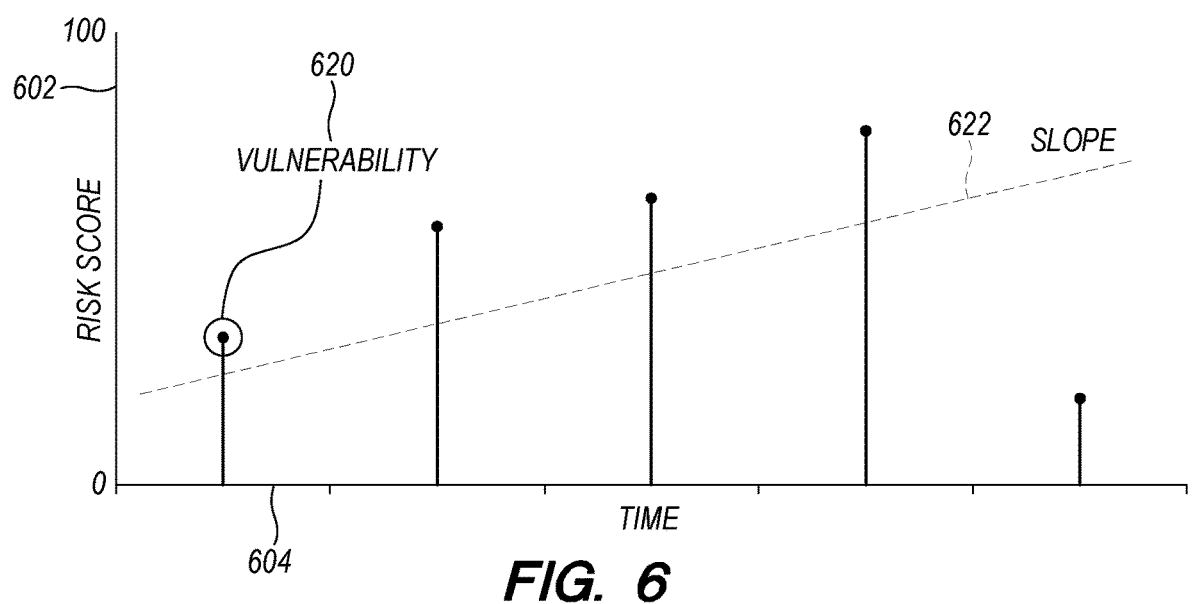
FIG. 6 illustrates an example trajectory of risk scores over time for a platform under test.

It is often helpful to the client device 110 to evaluate the risk scores over time, such as comparing risk scores on a month-to-month, quarter-to-quarter, or year-to-year basis, or even during a penetration test. As the post-engagement risk score can be computed repeatedly every time a new vulnerability is found, such comparisons serve the purpose of gauging the performance of immediate mitigating efforts. Thus, trending the risk scores over time enables measuring the inherent risks in the target assets and applying mitigating efforts to minimize the risks. FIG. 6 illustrates an example trajectory of risk scores over time for a client platform. The X-axis 604 corresponds to time, and the Y-axis 602 corresponds to the risk score for the client platform or a listing thereof. Each time a vulnerability is found, the corresponding (time during-penetration-test, risk score) can be plotted, such as the point 620. The recording of the time-of-penetration-test can in turn refer to a variety of sources, such as when a secure gateway for controlling testing coverage, findings, insights and analytics is set up, or when the vulnerability is found. The entire trajectory or time series may then include recorded data covering the entire set of found vulnerabilities within a given period of time. A trend, such as the slope 622, can be found in how the risk scores evolve over time.

The risk score model discussed above produces the risk score for a given asset in a relativized or piecewise manner, and does not take into account business objectives with built-in time-sensitive risk perception. For example, it might be a more urgent requirement to reduce heightened risk upon finding a large number of severe vulnerabilities at the onset of a penetration testing. The trending of the risk score could point to an increase or decrease in the risk perception. Referring back to FIG. 6, the slope 622 can be used to model the risk perception.

In some embodiments, the server 102 is programmed to compute a multiplier Gamma for a risk score based on this slope and a modified risk score Gamma Mod using the multiplier Gemma. The server 102 is configured to further first determine a range for the slope. An upper bound for the slope Upper Bound Slope can be determined by considering two points at different ends of the trajectory $(x_1, y_1)$ and $(x_2, y_2)$ as follows, $$\text{Upper Bound Slope} = \frac{y_2 - y_1}{x_2 - x_1} \tag{21}$$

In some embodiments, the server 102 is programmed to further determine the slope via linear regression based on additional data points recorded for the trajectory $\{(s_1, t_1), (s_2, t_2), \ldots (s_N, t_N)\}$, where each $t_j$ corresponds to a time when a vulnerability is found during the penetration test and $s_j$ corresponds to the risk score for the listing at the time. The server 102 is programmed to first compute a term A based on the total number of found vulnerabilities N and the values of the additional data points as follows, $$A = N \cdot \left[ \sum_{i=1}^{N} (s_i \cdot t_i) \right], \tag{22}$$

Specifically, the term A is computed as the product of number of vulnerabilities N with the sum of products of a vulnerability creation time and the corresponding risk score over all the found vulnerabilities. In the event that no vulnerabilities are found, the value of the term A is set to zero.

In some embodiments, the server 102 is programmed to further compute a term B also based on the total number of found vulnerabilities N and the values of the additional data points as follows, $$B = \left[ \sum_{i=1}^{N} (s_i) \right] \cdot \left[ \sum_{i=1}^{N} (t_i) \right], \tag{23}$$

The term B is defined as the product of vulnerability creation times and the sum of the corresponding risk scores over all the found vulnerabilities. As with term A, the term B is also set to zero in the event that no vulnerabilities are found in a given penetration test.

In some embodiments, the server 102 is programmed to further compute a term C based on the total number of found vulnerabilities N and the values of the additional data points as follows, $$C = N \cdot \left[ \sum_{i=1}^{N} (s_i)^2 \right], \tag{24}$$

The term C is defined as the product of number of vulnerability N and the sum of squares of a corresponding risk score over all the found vulnerabilities. Similarly, in the event that no vulnerabilities found, the term C is set to zero.

In some embodiments, the server 102 is programmed to further compute a term D based on the total number of found vulnerabilities N and the values of the additional data points as follows, $$D = \left[\sum_{i=1}^{N}(s_i)^2\right], \quad (25)$$

The term D is defined as the square of the sum of the corresponding risk scores over all the found vulnerabilities. As with the previous terms, in the event that no vulnerabilities are found in a given penetration test, the term D is set to zero.

In some embodiments, the server 102 is programmed to finally compute the term Slope based on the terms A, B, C, and D as follows:

$$\text{Slope} = \left[\frac{A-B}{C-D}\right] \quad (26)$$

When no vulnerabilities are found, all the constituent terms A, B, C, and D are set to the default value of zero, which may lead to a division by zero error. To obviate such an outcome, the server 102 is configured to further check whether an equality exists between A and B (or C and D), and when an equality exists set the Slope value to zero. In geometrical sense, a slope value of zero indicates that the linear regression line is flat because the risk scores of the all constituent vulnerabilities are approximately equal to one other. For conveying altered risk perception as described previously, those slopes that have values greater than zero after normalization (i.e. strictly non-zero positive slopes) tend to be more pertinent to the client. In one example, initial vulnerabilities corresponding to high risk score intervals lead to a low positive-valued slope, which conveys a high-risk nature of the attack surface. Further in the example, subsequent vulnerabilities corresponding to moderate or low risk score intervals lead to a negative-valued slope, which then conveys decreased risk (or increased resilience) perception.

In some embodiments, the server 102 is programmed to compute the multiplier Gamma as a function of the term Slope. One way to construct such a function is through first principles based on rulesets over interval partitioning. FIG. 7 illustrates an example table that maps a Slope interval to a Gamma value. The first column 724 indicates the Slope value intervals and the second column 726 indicates the Gamma values. When the Slope value is smaller, the Gamma value may be larger to to provide heightened risk perception for severe vulnerabilities identified at the outset, for example.

In some embodiments, the server 102 is programmed to further compute the modified risk score Gamma Mod or RiskScore$_{Gamma}$ based on Gamma as follows:

Risk Score$_{Gamma}$=RiskScore$_{Original}$·Gamma (27)

While an aggregated risk score as discussed above implicitly contains the information about the strongest (or weakest) link of the entire attack surface, modifying it further through a slope-based multiplier helps convey the necessary risk perception to the client device 110 that may be more tied to business objectives.

In modifying risk scores based on the multiplier Gamma, the time axis is considered to be one discrete bucket for the duration of a penetration test. However, such a coarse-grained time resolution is not conducive to modifying risk scores based on fine-grained information. In some embodiments, the server 102 is programmed to compute a multiplier Omega for a risk score based on the slope as discussed above and a modified risk score Omega Mod using the multiplier Omega.

In some embodiments, the server 102 is configured to first split the time axis into small time buckets, such as 20,160 (or 14 days×24 hours×60 minutes) one-minute periods on the time axis. Such a resolution can be used for deriving a higher-fidelity function of slope, which affects the risk score. In this case, Equation (21) above can produce a smaller value of 0.00496031746, where $y_2$, $y_1$, $x_2$, and $x_1$ correspond to 100, 0, 20160, and 0, respectively.

In some embodiments, the server 102 is programmed to compute the multiplier Omega as a function of the term Slope discussed above. One way to construct such a function is through first principles based on rulesets over interval partitioning. FIG. 8 illustrates an example table that maps a Slope interval and an original risk score interval to an Omega value. The first column 824 indicates the Slope value intervals, the second column 828 indicates the original risk score values, and the third column 830 indicates the Omega values. FIG. 8 shows normalized Slope values, which are mapped from the interval [−0.00496031746, 0.00496031746] to [0.5, 1], which is subdivided into three sub-intervals [0.00, 0.66], [0.67, 0.83], [0.84, 1.00] to be analogous to FIG. 7. Compared to Gamma, Omega utilizes the term Slope and the original risk score to help determine the multiplier Omega. Additionally taking the original risk score into consideration introduces further granularity into the risk score representation. Each Omega value can be used to modify the original risk score in a fine-grained manner. In addition, an aggregate Omega value computed over all the small intervals then corresponds to a more accurate overall slope and can be used as a more accurate multiplier than a Gamma value.

In some embodiments, the server 102 is programmed to further compute the modified risk score Omega Mod or RiskScore$_{Omega}$ based on Omega as follows, Risk Score$_{Omega}$=Risk Score$_{Original}$·Omega (28)

The risk score model works better when a statistically significant number of listings and vulnerability samples are available. A threshold for statistical significance is informed through the denominator term N given in Equations (6) and (7) above. In particular, if N=0 or 1, neither equation provides statistically correct output. In some embodiments, the server 102 is programmed to compute a modified risk score One-off Vuln Mod to mitigate the corner-case outcome. Specifically, the server 102 is configured to compute the researcher computer cost $W_i$ as the inverse of researcher computer efficiency $E_i$ that is not proportionally or normally adjusted over a given distribution due to non-existence of such distributions. Thus, the modified risk score One-off Vuln Mod in this case is based on the alternate description of the researcher computer cost $W_i$.

In addition, small variances in the vulnerability factor $V_i$ could contribute toward a flat slope. In one embodiment, the server 102 is programmed to assign a value of zero to a post-engagement risk score when the vulnerability factor $V_i$ is zero. The server 102 can be further programmed to compute a modified risk score Delta Mod by determining the scaled raw vulnerability score, such as a CVSS score, for each of the found vulnerabilities and subtracting the scaled raw vulnerability score from the original risk. One way to compute the scaled raw vulnerability is by constructing linear models for scaling purposes. FIG. 9 illustrates an example table that maps a raw vulnerability score interval to a scaled raw vulnerability score as an adjustment to an original risk score. The first column 914 indicates the CVSS score intervals, the second column 932 indicates the corresponding linear models used to scale a CVSS score that falls in that interval, which scaled CVSS score is to be subtracted from the original risk score. The third column 934 indicates the ranges of the scaled CVSS score value.

For example, when the CVSS for a given vulnerability is 10.00 then the selected linear model is: (20×CVSS−160). Subsequently, the value of 40 generated by the linear model on CVSS value of 10.00 is subtracted from the overall post-engagement risk score. As the raw vulnerability values increase, the values to be subtracted from the post-engagement risk score also increase. As a result, sets of different vulnerabilities are more likely to produce significantly different vulnerability factor $V_i$ values and ultimately significantly different post-engagement risk scores.

In some embodiments, the server 102 is programmed to implement a notification scheme based on the post-engagement score. The server 102 can be configured to assign risk into classes indicating discrete risk levels. Different classes can be associated with different frequencies of sending alarms or reminders to the client device 110 to implement appropriate remedial procedures. Different classes can also be associated with different types of recommendations for remedial actions. For example, for a class corresponding to a lower risk level, the server 102 can be configured to transmit a recommendation to the client device 110 for software patches applicable to specific surfaces, while for a class corresponding to a higher risk level, the server 102 can be configured to transmit a recommendation to the client device 110 for infrastructural changes. Furthermore, the server 102 can be configured to request the client device 110 to send information regarding any implemented remedial procedures. As discussed above, at least some of such information, such as path remediation time and patch efficacy, can be used to further adjust the risk scores.

4.0 Example Processes

Figure 10:
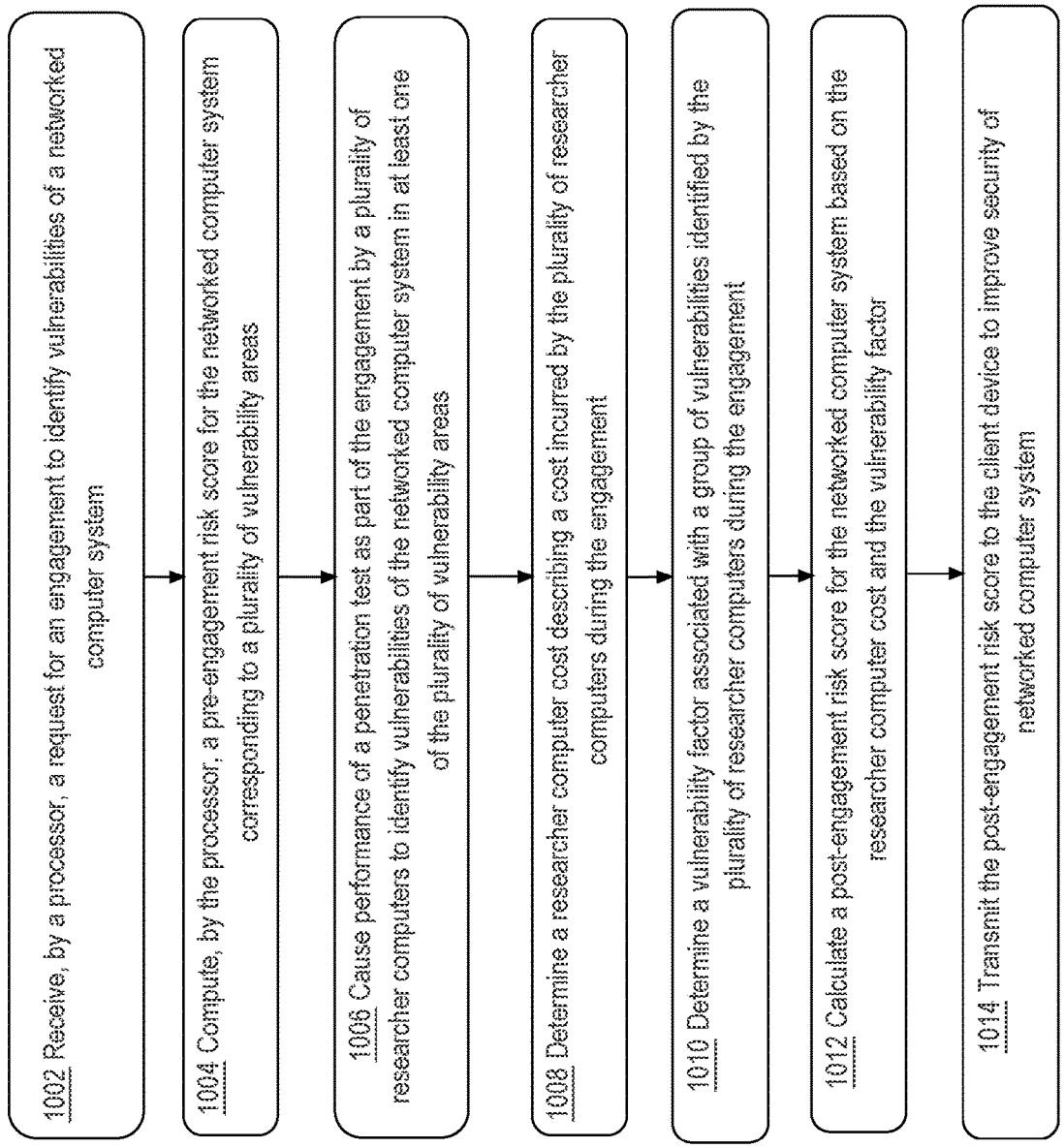
FIG. 10 illustrates an example process performed by the risk management computer of assessing and remediating security risk in a networked computer system.

FIG. 10 illustrates an example process performed by the risk management computer of assessing and remediating security risk in a networked computer system. FIG. 10 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 1002, the server 102 is programmed to receive a request from a client device for an engagement to identify vulnerabilities of a networked computer system associated with the client device. The engagement could cover one or more platforms or surfaces of the networked computer system. In step 1004, the server 102 is programmed to compute a pre-engagement risk score for the networked computer system corresponding to a plurality of vulnerability areas. The areas where vulnerabilities can be found can be related to the overall size and structure of the networked computer system or a platform or surface thereof, the strength of TLS/SSL protocol of the networked computer system or a platform or surface thereof, or the routing and re-routing of requesting of received requests to specific IP addresses performed by the networked computer system or a platform or surface thereof. In step 1006, the server 102 is programmed to cause performance of a penetration test as part of the engagement by a plurality of researcher computers to identify vulnerabilities of the networked computer system in at least one of the plurality of vulnerability areas. The server 102 can be programmed to notify the plurality of researcher computers of one or more listings corresponding to specific platforms or surfaces of the networked computer system as specified in the engagement and invite them to simulate computer attacks to the networked computer system corresponding to those listings as part of the penetration test.

In some embodiments, the server 102 is programmed to subsequently receive reports of vulnerabilities in the networked computer system from one or more of the plurality of researcher computers. In step 1008, the server 102 is programmed to then determine a researcher computer cost describing a cost incurred by the plurality of researcher computers so far in the engagement. Specifically, the server 102 can be configured to calculate a researcher computer efficiency based on a severity level of the vulnerabilities found so far and a researcher computer power, the researcher computer power further based on a number of computer attacks made to the networked computer system by the plurality of researcher computers so far. In step 1010, the server 102 is programmed to determine a vulnerability factor associated with a group of vulnerabilities identified by the plurality of researcher computers so far. Specifically, the server 102 can be configured to assign each of the group of vulnerabilities to one of a plurality of classes of severity levels and compute the vulnerability factor based on a size of each of the plurality of classes. In step 1012, the server 102 is programmed to calculate a post-engagement risk score for the networked computer system based on the researcher computer cost and the vulnerability factor. The server 102 can be programmed to further compute a resilience score reflecting a strength of the networked computer system against computer attacks so far and calculate the post-engagement risk score for the networked computer system further based on the resilience score. In step 1014, the server 102 is programmed to transmit the post-engagement risk score to the client device to improve security of networked computer system. Alternatively, the server 102 can be configured to prepare one or more recommendations for patching the underlying vulnerabilities based on the post-engagement risk score, which may improve the resilience of the networked computer system to adversarial attacks over time. The server 102 can then be configured to further transmit the post-engagement risk score to the target client along with the recommendations. The server 102 can also be programmed to compute a post-engagement risk score repeatedly during the engagement and the use the repeatedly-computed post-engagement risk scores to generate a final post-engagement score that better characterizes the time-sensitive risk perception.

5.0 Implementation Example—Hardware Overview

According to one embodiment, the techniques described herein are implemented by one or more special-purpose computing devices. The special-purpose computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
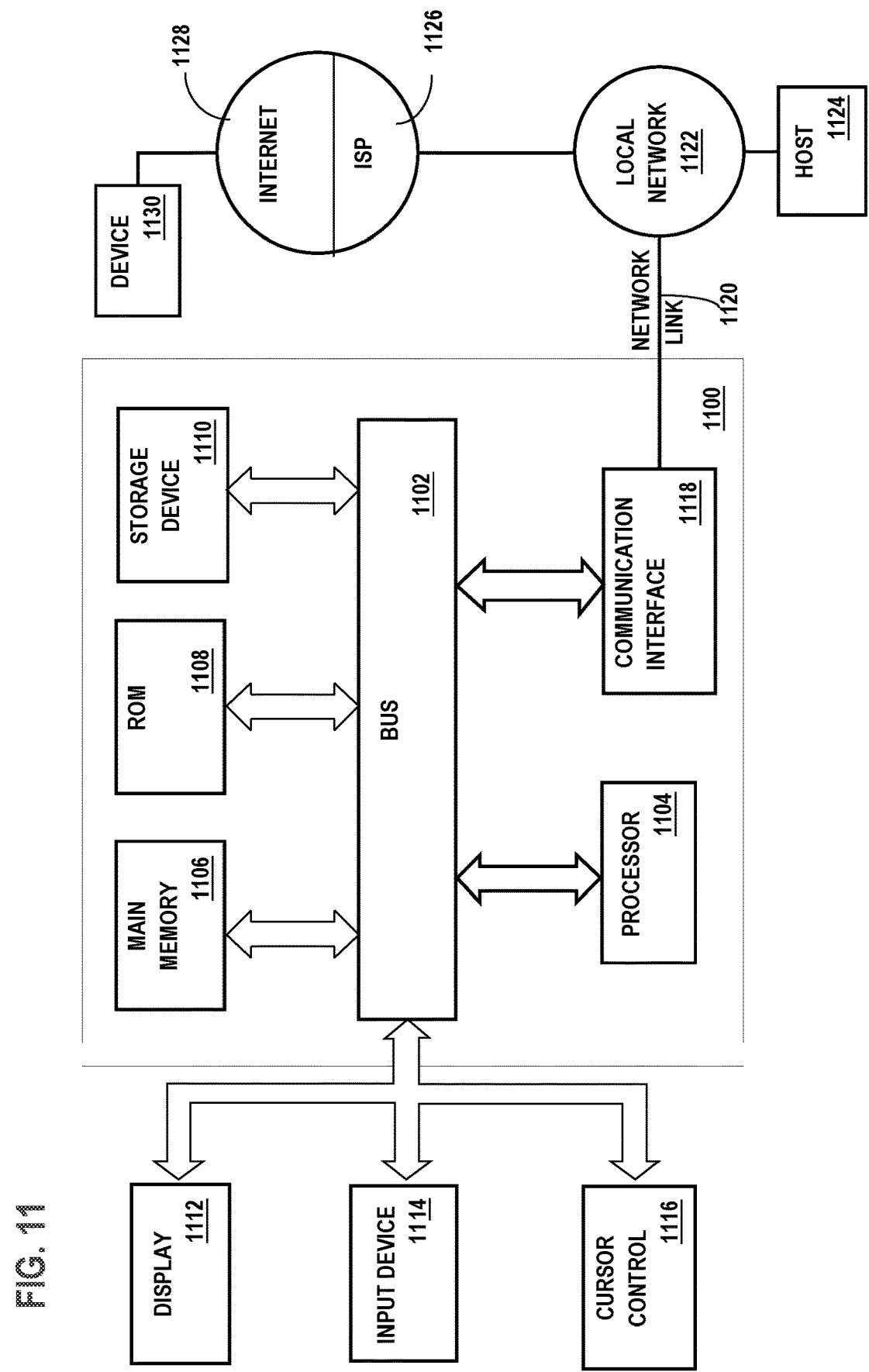
FIG. 11 illustrates an example computer system with which an embodiment may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, a NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infrared data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infra-red detector can receive the data carried in the infrared signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of assessing and addressing computer security risk, comprising:
   receiving, by a processor, a request from a client device for an engagement to identify vulnerabilities of a networked computer system;
   computing, by the processor, a pre-engagement risk score for the networked computer system corresponding to a plurality of vulnerability areas;
   causing, by the processor, performance of a penetration test as part of the engagement by a plurality of researcher computers to identify vulnerabilities of the networked computer system in at least one of the plurality of vulnerability areas;
   determining a researcher computer cost describing a cost incurred by the plurality of researcher computers during the engagement;
   determining a vulnerability factor associated with a group of vulnerabilities identified by the plurality of researcher computers during the engagement;
   calculating a post-engagement risk score for the networked computer system based on the researcher computer cost and the vulnerability factor;
   transmitting the post-engagement risk score to the client device to improve security of networked computer system.

2. The computer-implemented method of claim 1, computing the pre-engagement risk score being based on a transfer susceptibility flag for the networked computer system, a number of undesirable services found in the networked computer system, a number and severity of vulnerability found in the networked computer system, a size of the networked computer system, and an SSL strength score of the networked computer system.

3. The computer-implemented method of claim 1, determining the researcher computer cost further comprising calculating a researcher computer efficiency based on a severity level of the group of vulnerabilities and a researcher computer power, the researcher computer power further based on a number of computer attacks made to the networked computer system by the plurality of researcher computers during a given period of time within the engagement.

4. The computer-implemented method of claim 3, determining the researcher computer cost further comprising taking an inverse of the researcher computer efficiency.

5. The computer-implemented method of claim 3, determining the researcher computer cost further comprising standardizing, shifting or scaling the researcher computer efficiency into a specific domain.

6. The computer-implemented method of claim 3, the severity level of the group of vulnerabilities being a weighted sum of raw vulnerability scores of the group of vulnerabilities, with larger weights given to larger raw vulnerability scores of the group of vulnerabilities.

7. The computer-implemented method of claim 1, determining the vulnerability factor further comprising:
   assigning each of the group of vulnerabilities to one of a plurality of classes of severity levels;
   computing the vulnerability factor based on a size of each of the plurality of classes.

8. The computer-implemented method of claim 1, further comprising:
   computing a scaled value for a raw vulnerability score of each of the group of vulnerabilities based on linear models,
   the linear models producing larger scales for intervals of larger raw vulnerability scores,
   updating the calculating a post-engagement risk score with the group of scaled values.

9. The computer-implemented method of claim 1, further comprising
   computing a resilience score reflecting a strength of the networked computer system against computer attacks hitting the networked computer system during the engagement,
   calculating the post-engagement risk score for the networked computer system being further based on the resilience score.

10. The computer-implemented method of claim 9, computing the resilience score further comprising:
    causing application of one or more software patches to remediate the group of vulnerabilities;
    determining a patch remediation time associated with the application;
    calculating a patch efficacy associated with the application;
    computing the resilience score based on the patch remediation time and the patch efficacy.

11. The computer-implemented method of claim 10, determining the patch remediation time further comprising:
    assigning each of the one or more software patches into a plurality of classes corresponding to different amounts of time taken for patch application;
    computing the patch remediation time based on a size of each of the plurality of classes.

12. The computer-implemented method of claim 10, the patch efficacy being calculated as an aggregate of patch efficacy over the one or more software patches.

13. The computer-implemented method of claim 1, further comprising:
    calculating a post-engagement risk score upon identification of each of a subset of the group of vulnerabilities during the engagement;
    determining a slope from the subset of post-engagement risk scores obtained over a time interval during the engagement;

computing a final post-engagement risk score based on the last-calculated post-engagement score and the slope.

14. The computer-implemented method of claim 13, determining the slope comprising performing a linear regression over the time interval at once.

15. The computer-implemented method of claim 13, determining the slope comprising:
    performing a linear regression over each of a plurality of sub-intervals of the time interval each time;
    aggregating a plurality of results of the plurality of linear regressions.

16. The computer-implemented method of claim 13, computing the post-engagement risk score further comprising:
    computing a multiplier that has a smaller value when the slope has a larger value;
    computing the post-engagement risk score based on the multiplier.

17. The computer-implemented method of claim 1, the networked computer system comprising one or more of a host computer platform, a mobile platform, and a web platform.

18. The computer-implemented method of claim 1, further comprising determining a relative measure of the post-engagement risk score to a group of post-engagement risk scores for other networked computer systems.

19. One or more non-transitory storage media storing instructions which, when executed by one or more computing devices, cause performance of a method, the method comprising:
    receiving a request for an engagement to identify vulnerabilities of a networked computer system;
    computing a pre-engagement risk score for the networked computer system corresponding to a plurality of vulnerability areas;
    causing performance of a penetration test as part of the engagement by a plurality of researcher computers to identify vulnerabilities of the networked computer system in at least one of the plurality of vulnerability areas;
    determining a researcher computer cost describing a cost incurred by the plurality of researcher computers during the engagement;
    determining a vulnerability factor associated with a group of vulnerabilities identified by the plurality of researcher computers during the engagement;
    calculating a post-engagement risk score for the networked computer system based on the researcher computer cost and the vulnerability factor;
    transmitting the post-engagement risk score to a client device to improve security of networked computer system.

20. A computer system, comprising:
    one or more processors;
    a memory comprising a set of instructions which when executed causes the one or more processors to execute a method, the method comprising:
    receiving a request for an engagement to identify vulnerabilities of a networked computer system;
    computing a pre-engagement risk score for the networked computer system corresponding to a plurality of vulnerability areas;
    causing, by the processor, performance of a penetration test as part of the engagement by a plurality of researcher computers to identify vulnerabilities of the networked computer system in at least one of the plurality of vulnerability areas;
    determining a researcher computer cost describing a cost incurred by the plurality of researcher computers during the engagement;
    determining a vulnerability factor associated with a group of vulnerabilities identified by the plurality of researcher computers during the engagement;
    calculating a post-engagement risk score for the networked computer system based on the researcher computer cost and the vulnerability factor;
    transmitting the post-engagement risk score to a client device to improve security of networked computer system.

* * * * *